Feb. 14, 1933. B. P. HOFFMAN 1,897,804
PACKING
Filed April 2, 1930

INVENTOR
*Benjamin P. Hoffman*
BY *Arthur C. Brown.*
ATTORNEY

Patented Feb. 14, 1933

1,897,804

UNITED STATES PATENT OFFICE

BENJAMIN P. HOFFMAN, OF TULSA, OKLAHOMA, ASSIGNOR OF ONE-HALF TO CHARLES S. JONES, OF TULSA, OKLAHOMA

PACKING

Application filed April 2, 1930. Serial No. 441,050.

My invention relates to packing and more particularly to a device of that character for use in connection with stuffing boxes to seal the entrance of polish rods into well tubing.

The principal object of my invention is to provide sealing members, particularly adapted for use in stuffing boxes of the above character, that embody means for distributing lubricant evenly over the portion of a polish rod engaging the sealing member to prevent excessive friction and consequent heating of the members.

A further object is to provide sealing elements that are self-draining to prevent impairment of the members due to retention of lubricants therein.

In accomplishing these and other objects of my invention, I have provided improved details of structure the preferred form of which is illustrated in the accompanying drawing, wherein.

Figure 1:
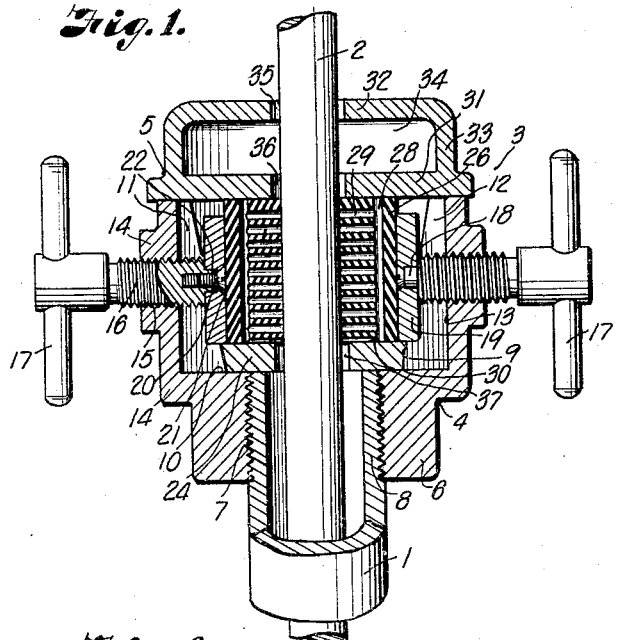
Fig. 1 is a central vertical section of a stuffing box provided with sealing members embodying my invention and illustrated in operable relation with a polish rod.
Figure 2:
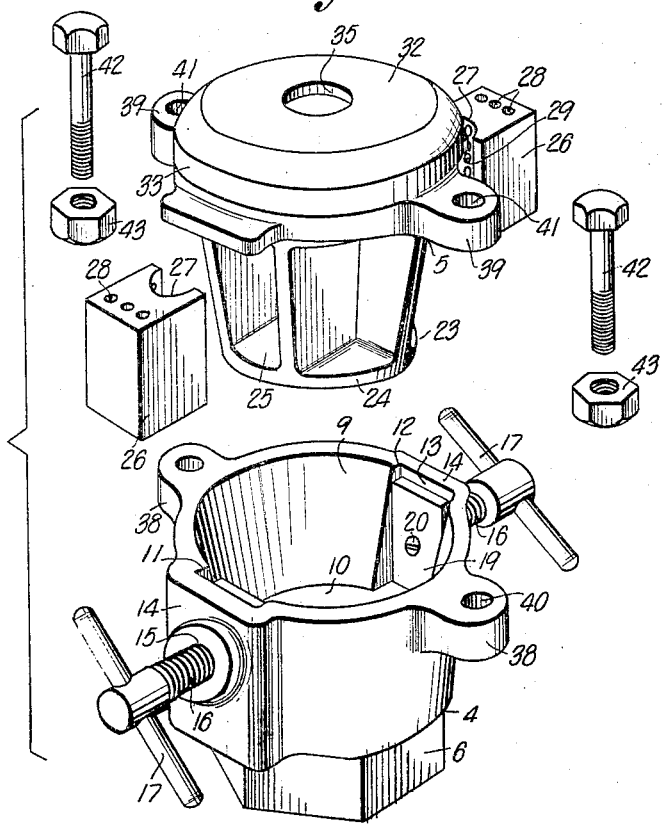
Fig. 2 is a detail perspective view of the parts of the stuffing box illustrated in disassembled relation.
Figure 3:
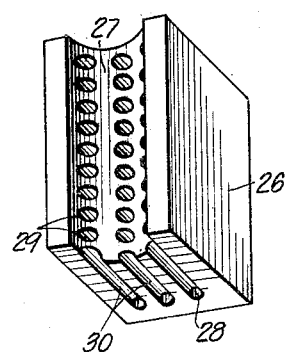
Fig. 3 is a perspective view of one of the sealing members, particularly illustrating drainage grooves in the bottom end of the member.

Referring more in detail to the drawing: 1 designates the upper end of a well tubing and 2 a section of a polish rod extending through a stuffing box 3 mounted on the tubing, the polish rod connecting a string of sucker rods with a pump jack or the like as in common practice.

The stuffing box includes generally a housing or body portion 4 and a cover member 5, the body portion being provided with a hexagonal flange 6 having an internally threaded axial opening 7 for engaging the upper threaded end 8 of the tubing.

Extending into the housing is a conical recess 9 terminating in a bottom wall 10, aligning sockets 11 and 12 provided with perpendicular walls 13 being formed in the recess and in extended bosses 14 of the body member for a purpose presently described.

Mounted in transverse, internally threaded openings 15 of the bosses 14 are adjusting screws 16, provided with operating bars 17, and having bosses 18 on their inner ends for pivotally mounting compressing plates 19; said plates being attached to the members 16 by screws 20 extended through openings 21 of the plates and threaded concentrically into openings 22 of the screws 16.

The cover member 5, includes a depending portion 23 terminating in a lower end wall 24 for seating engagement with the wall 10 of the housing, and extending transversely through the depending portion is a rectangular opening 25 for slidably receiving a pair of sealing members or blocks 26, preferably formed of resilient material. The sealing members are provided with arcuate recesses or bearing faces 27 urged into sealing engagement with the polish rod by the compressing plates 19 moved inwardly into the housing by the adjusting screws 16. Each sealing member is further preferably provided with longitudinal ports 28 and with series of transverse ports 29 communicating the longitudinal ports with the arcuate recess.

With this construction of the sealing members, oil from the well or other lubricant is fed to the polish rod through the transverse and longitudinal ports, grooves 30 in the lower end of the sealing member permitting lubricant to drain from the ports back into the tubing to prevent excessive deterioration of the sealing members.

The member 5 further includes cover portions 31 and 32 spaced by an annular rim 33 to form a chamber 34 between the cover members. Concentric openings 35, 36, and 37 are provided in the cover members and in the lower end wall 24 respectively for receiving the polish rod, the openings being slightly larger than the rod to permit freedom of rod travel therethrough.

The chamber 34 serves as a reservoir for lubricant to effect sealing relation between the polish rod and the sealing members, the upper cover member 32 also serving as a shield to prevent spraying of oil from the stuffing box, after the sealing members become worn.

Means for securing the cover member 5 to the housing 4 include a pair of aligning ears 38 on the housing and a cooperating pair of ears 39 on the cover member, openings 40 and 41 being provided in said ears respectively for receiving bolts 42, and nuts 43 being threaded on the bolts for clamping the parts together.

A stuffing box provided with sealing members constructed as described may be mounted on the upper end of well tubing, with the polish rod extending through the concentric aligning opening of the cover member. Adjustment of the sealing members in relation to the polish rod is obtained by threading the adjusting screws into or out of the body member. After the sealing members become worn so that adjustment is no longer possible they may be readily replaced by new blocks.

Due to the perforations in the sealing members, lubricant is distributed evenly over the entire portion of the polish rod engaging the blocks, thereby preventing excessive friction and consequent heat which would rapidly deteriorate the rubber or other composition sealing members.

Lubricant which would also tend to impair the blocks if permitted to remain in the perforation during shut-down of the equipment is free to drain back into the well through the lower vertical ports and lower grooves. While the sealing elements have been disclosed as used in a specific type of stuffing boxes it is obvious that they may also be installed in various other types of boxes to produce similar results.

What I claim and desire to secure by Letters Patent is:

1. A rectangular packing element having a bearing face, and having a plurality of longitudinal openings and transverse ports communicating said openings with the bearing face.

2. A packing element having a bearing face and a lower end face, said element having a longitudinal opening, a port leading from the opening through said bearing face, and a groove in said lower face communicating with the longitudinal opening.

3. A resilient packing element of the character described, having a bearing face and a lower end face, said element having a longitudinal opening, a series of ports leading from the opening through said bearing face, and a groove in said lower face communicating with the longitudinal opening.

4. A resilient packing element having an arcuate face, a plurality of longitudinal openings and a series of transverse ports leading from each longitudinal opening through said arcuate face.

5. A resilient packing element having an arcuate face and a lower end face, said element leaving a plurality of longitudinal openings, a series of transverse ports leading from each longitudinal opening through said arcuate face and a series of grooves in said lower face communicating with the longitudinal opening.

6. A resilient packing element of the character described, having a bearing face and a lower end face, said element having a groove in its lower end face, and a port leading from said groove through the bearing face.

7. A resilient packing element of the character described, having a bearing face and a lower end face, said element having a plurality of grooves in its lower end face, and ports leading from each of said grooves through the bearing face.

In testimony whereof I affix my signature.

BENJAMIN P. HOFFMAN.